March 25, 1969
W. C. BROWN ET AL
3,434,678
MICROWAVE TO DC CONVERTER
Filed May 5, 1965
Sheet 1 of 3
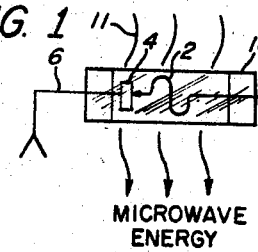
FIG. 1
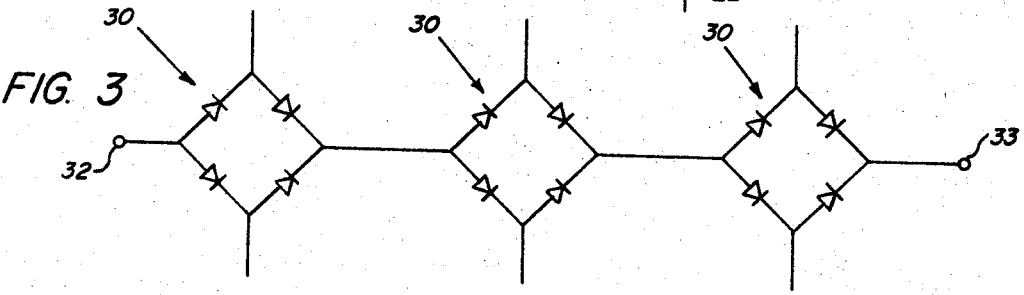
FIG. 2
FIG. 3
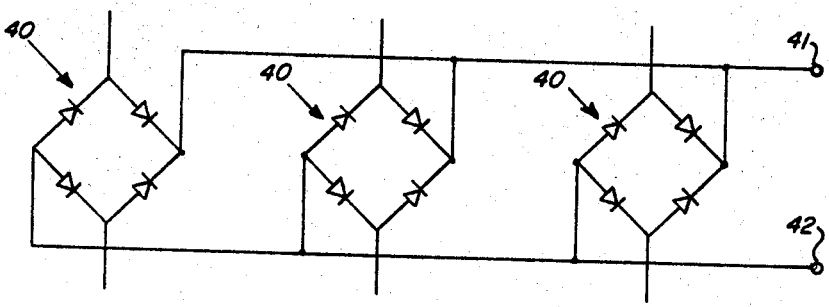
FIG. 4
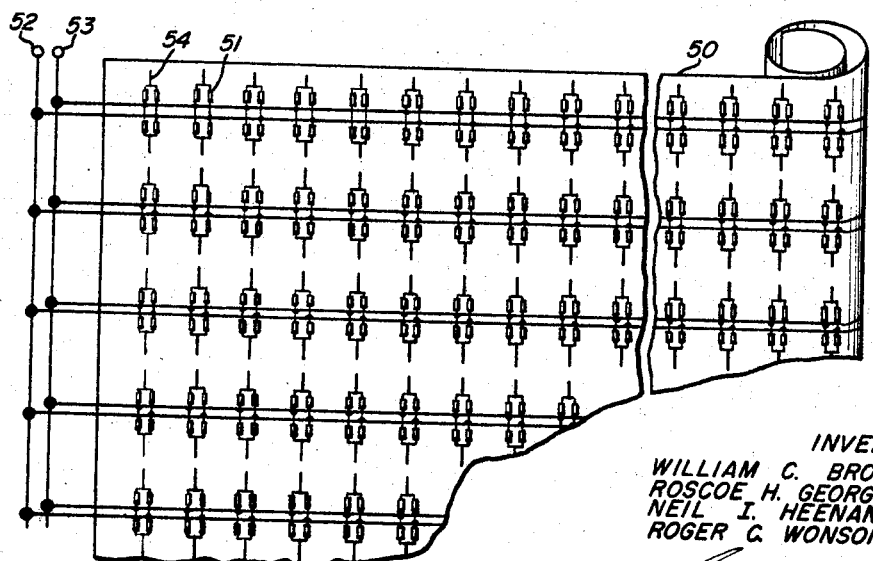
FIG. 5
INVENTORS
WILLIAM C. BROWN
ROSCOE H. GEORGE
NEIL I. HEENAN
ROGER C. WONSON
BY
ATTORNEY United States Patent Office 3,434,678
Patented Mar. 25, 1969

3,434,678
MICROWAVE TO DC CONVERTER
William C. Brown, Weston, Mass., Roscoe H. George, West Lafayette, Ind., and Neil I. Heenan, Needham, and Roger C. Wonson, Beverly, Mass., assignors to Raytheon Company, Lexington, Mass., a corporation of Delaware
Filed May 5, 1965, Ser. No. 453,415
Int. Cl. B64g 1/00
U.S. Cl. 244—1
3 Claims

ABSTRACT OF THE DISCLOSURE

A combined antenna and conversion mechanism for reception of beamed high frequency electromagnetic energy in space including a large array of unidirectional current semiconductor rectifier devices. A self-supporting space vehicle utilizing the rectified DC electrical energy for propulsion is disclosed in an illustrative embodiment.

---

The present invention relates in general to the transfer of energy by means of an electromagnetic wave beam and more particularly to interception and rectification of such energy into low frequency electrical DC energy with a high degree of efficiency.

Improved technology in the field of microwave energy generation at superpower levels has resulted in the realization of electrical energy transmission over considerable distances for remote energization of devices or vehicles without the aid of wires. The transmission of microwave electromagnetic energy into space has been commonly employed in the radar pulse echo systems for the detection and orientation of desired objects within a predetermined scanning range of a transmitting antenna. Beams of a similar nature may now be employed for other useful purposes and the advantages attendant the utilization of electromagnetic energy in the microwave region in contrast with other wavelengths may now be enumerated.

Microwaves have been generally defined as high frequency radio waves whose wavelength is less than 30 centimeters, with a lower wavelength limit on the order of 1 millimeter sometimes being applied to what is commonly referred to as the "microwave region." The superiority of high frequency microwaves is due in part to the fact that it is generally desirable to focus the transmitted energy so as to achieve a high power density at a remote point or area with respect to a given power source. In accordance with the laws of optics, the sharpness of the microwave beam produced by a transmitting antenna varies as the ratio of antenna dimensions to the wavelength of the transmitted energy. Therefore, for a given or desired power density or beam sharpness, a decrease in the wavelength of the transmitted energy permits a corresponding decrease in the dimensions of the antenna. From the standpoint of mechanical considerations, it is desirable to employ small antennas and other components, and it is therefore advantageous to employ high frequency energy of very short wavelength. In addition, the difficulties encountered in long wave transmission as a result of natural and man-made interference or noise do not occur with any appreciable significance at microwave frequencies. Further, in aerospace applications with considerable distances separating the transmitter at an earth or mother planet location and the employment of shorter wavelength beamed energy is preferred since longer wave signals will generallly be reflected at certain altitudes by reflecting layers in the atmosphere.

In view of certain losses due to absorption which may occur in the atmosphere, microwaves in the region having the approximate bounds of 2 and 30 centimeters are readily adaptable to the convenient radiation of power to remote points without the utilization of wires. The preferred wavelengths are of the order of 5 or 10 centimeters to provide efficient focusing with existing transmitting antenna systems which may be maintained at a reasonable size. An illustrative device of the superpower high frequency microwave generators operative in the desired band is the so-called Amplitron which is an amplifier having a broad bandwidth and excellent performance characteristics for the focusing of the beam. Such devices are capable of producing 15 or 20 kilowatts of average continuous wave power in the neighborhood of 10 centimeters in wavelength with capabilities expected in the region of 500 kilowatts or more average power with 50 megawatts peak power. A complete description of such devices may be had by referring to Patent No. 2,933,723 issued Apr. 19, 1960 to William C. Brown and assigned to the assignee of the present invention.

With microwave energy capable of being generated and directed over longer distances conversion of such high frequency electromagnetic energy is of paramount concern. One conversion mechanism in the prior art involves direct conversion of such energy into heat which may then be utilized directly or indirectly for propulsion or generation of flight-producing forces. Examples of such devices for heat energy exchange as well as space vehicles utilizing such energy may be noted in Patent No. 3,174,-705, issued Mar. 23, 1965, to D. Schiff et al., as well as U.S. Letters Patent No. 3,083,528, issued Apr. 2, 1963 and No. 3,114,517, issued Dec. 17, 1963, to William C. Brown. The heat exchanger method of conversion of electromagnetic energy into useful power is limited by the overall efficiencies of approximately 25 percent in the conversion of heat into mechanical or electrical work. Desirable, therefore, would be the direct rectification of the high frequency electromagnetic energy into low frequency electrical energy for the operation of many useful aerospace devices as well as systems.

The present invention has for its primary object the conversion of high frequency electromagnetic energy in the microwave region directly into low frequency electrical energy.

A further object of the present invention is the provision of a combined nondirectional receiving antenna and microwave electromagnetic energy to low frequency electrical energy conversion means in a unitary structure.

A still further object of the present invention is a provision of a new and novel combined nondirectional receiving antenna and microwave to DC energy converter for aerospace applications.

Another object of the present invention is the provision of a new and novel nondirectional receiving antenna and microwave to DC energy converter having a high degree of efficiency.

Still another object of the present invention is the provision of a new and novel aerospace vehicle with nondirectional receiving antenna and microwave to DC energy converter means with said vehicle being capable of being supported by its own energy generation means at a distance spaced apart from the power generation means.

In accordance with the teachings of the present invention, the above and other objects are achieved by the employment of efficient unidirectional microwave power rectifiers and dipole antenna means. Such rectifying devices, while being individually limited in power-handling capabilities, normally in the order of fractions of watts, have been found to be highly efficient means for the rectification of microwave power when assembled in large numbers in various arrays. It is interesting to note that the observed collective efficiency was on the order of 40 to 70 percent. In an illustrative embodiment, point-contact semiconductor diodes were arranged in four arm bridge connected networks with the networks interconnected in various configurations such as series, parallel and series-parallel.

In discussing aerospace applications, an additional problem is encountered in the beaming of microwave energy to a remote point and the interception and utilization of such electrical energy. In such applications the advantages of a vehicle which may be maintained in space for indeterminate periods of time without employing a local fuel source are readily apparent. Such devices could readily provide communication networks, surveillance functions using radar techniques along with numerous other functions. The acapture of the beamed high frequency electromagnetic energy raises the need for an efficient antenna means capable of intersecting the beam at high altitudes. Conventional techniques employed in microwave radar usage such as receiving antenna horns are capable of intersecting only a small portion of the beam energy and add considerable weight in applications involving heavier-than-air vehicles. In an exemplary embodiment of the invention a space vehicle, namely a helicopter, is disclosed for either moving flight or a stationary location with self-supporting electrically operative propulsion means. The semi-conductor diode rectifier arrays have been demonstrated to fulfill the receiving antenna functions as well as the electrical energy rectification means in a highly efficient manner. Such combined antenna and rectifier means has also assisted in reduction of the weight problem in airborne devices. Further, it has provided a nondirectional means for the interception of the microwave energy to thereby reduce the problems of focusing inherent in prior art directional horn type receiving antennas.

With the above features, advantages and objects in mind the invention will now be described by reference to the following detailed description together with the accompanying drawings in which:

FIG. 1 is a perspective view of an illustrative diode rectifier;

FIG. 2 is a schematic circuit diagram of a bridge connected diode network with dipole antenna means;

FIG. 3 is a schematic circuit diagram of a plurality of bridge connected networks arranged in series;

FIG. 4 is a schematic circuit diagram of a parallel bridge connected network array;

FIG. 5 is a perspective view of an illustrative embodiment of a combined antenna and rectifier array in a folded or rolled up configuration;

Figure 7:
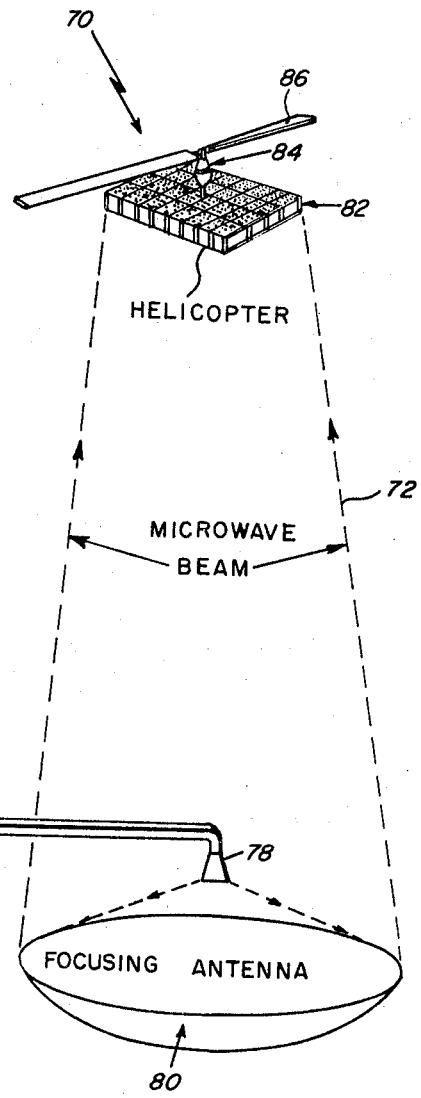
FIG. 7 is a schematic representation in elevation illustrative of a heavier-than-air aerospace vehicle incorparating the structure of the present invention.

FIG. 1 illustrates a point-contact semiconductor diode rectifier of the type employed in radar microwave receiver apparatus to rectify returned radar pulses. Any of the high burnout semiconductor diodes having high rectification characteristics are preferred and are commercially available, such as the 1N82 or 1N830. The rectifying junction is formed by whisker element 2 contacting the semiconductor element 4 respectively connected to leads 6 and 8. Silicon is preferred over germanium for element 4 because of its ability to operate at higher temperatures and thereby handle higher powers. Envelope 10 houses the rectifying elements and may be of a hermetically sealed dielectric material or combination metal and ceramic composition. The inherent characteristic of such diode rectifiers is that the microwave energy is intercepted and rectified in a unidirectional manner and the line 11 indicate pictorially the rays of the beamed electromagnetic microwave energy in a plane normal to the envelope. In FIG. 2 a full-wave bridge connected diode network is illustrated with the forward direction of the rectified DC electric current indicated by the direction of the arrow symbols. The network shown consists of half-wave dipoles 20 and 22 each terminated with a diode rectifier element 24 to 27 in an arm of the bridge connected network. The dipole elements 20 and 22 are of the half-wave configuration and may be spaced apart from each other a one-half wavelength at the frequency of the beamed electromagnetic energy.

Referring now to FIG. 3, an array of bridge connected diode networks each with the half-wave dipoles are shown connected in series. Each network is referred to by the numeral 30 and is similar in the bridge connections to the single element network shown in FIG. 2. The DC output of the collective rectified energy is coupled by means of terminals 32 and 33. In FIG. 4, a similar number of individual bridge connected diode-dipole networks are shown connected in a parallel array. Each network is indicated by the numeral 40, and the output terminals are indicated as 41 and 42.

Any number of diode-dipole networks may be provided and in FIG. 5 such a multi-element array is illustrated by mounting on a flexible material 50 which may be rolled or folded into any desired package or enclosed within a capsule to be launched and released at a predetermined point in space. Any flexible material which is pervious to electromagnetic energy is preferred. The total power desired would be the determining factor in a number of individual diode-dipole elements required. In this embodiment, the bridge connected networks 51 are connected in parallel to the output load indicated by terminals 52 and 53, and representative measurements of electrical characteristics have shown that approximately five watts of DC electrical energy is realizable for each square foot of area of the combined antenna-rectifier. While the dipole elements 54 have been indicated in a particular array, it is within the scope of the invention to stagger the placement of such dipoles to increase the overall efficiency of the antenna-rectifier.

Figure 6:
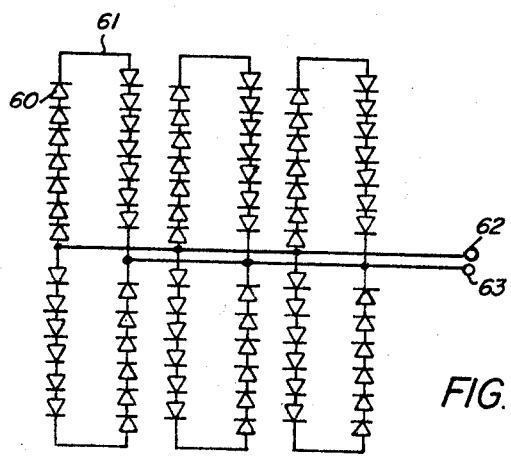
FIG. 6 is a schematic circuit diagram illustrating the bridge connected diode array incorporated in the aerospace vehicle shown in FIG. 7.

To further increase the DC powder output, the full-wave bridge connected networks are preferably arranged with a plurality of diodes in series in each arm of the bridge. An illustrative schematic circuit diagram of such a configuration is shown in FIG. 6 wherein seven diodes 60 are shown in each arm of the bridge circuit and are connected in series for a total of twenty-eight diodes in each bridge network. The dipole members will then be the substantially U-shaped end portions 61 at the ends of each brace of seven diodes. In the illustration three such twenty-eight diode bridge networks are shown connected in parallel to terminals 62 and 63. This closer spacing and compact arrangement has been shown to be a source of improved power output and is capable of a high degree of reliability through the redundant nature of the parallel series connections within each bridge network. If one of the diode rectifiers fails to function the over-all voltage drop across this element would be divided among the six remaining diode rectifiers. If any of the connecting wires between the diode elements should break, the adjacent arms of the other bridge assemblies would take the additional load due to the close proximity of the respective arms to each other. In addition, it is possible to have a number of open connections or inoperative diodes dispersed throughout the array without any serious impairment in performance.

In relation to the array concept to be hereinafter described it may be stated that within a six inch square area ten such individual bridge networks each containing twenty-eight diode rectifiers for a total of 280 diode rectifiers may be deployed in such a manner as to provide maximum exposed area for each diode as well as the connecting leads. Such an arrangement will be hereinafter referred to as a "module" and a DC output in excess of fourteen watts has been measured for such a module. Any number of such modules could be connected provided for a desired power yield and this module concept readily lends itself to use in certain aerospace applications now to be described.

In FIG. 7 a propelled type of space vehicle 70 is shown wholly supported by means of the transfer and rectification of continuous wave electromagnetic energy via a microwave beam 72. The source of the microwave energy which may be of the Amplitron type device as described in the aforementioned issued Patent No. 2,933,723 is indicated as 74. This energy is fed by waveguide means 76 to a transmitting horn 78 to illuminate an ellipsoidal beam forming focusing antenna 80 for the transmission of the microwave beam 72. It will be appreciated by those skilled in the art that the representations of the microwave generation and transmitting antenna means are pictorial representations to illustrate the usage of the invention in diagrammatic form and the present invention is not limited to any particular source of microwave energy or transmitting antenna assembly. It may be stated the reflector of the antenna assembly is considerably larger than most of the reflectors of the prior art in order to focus a large amount of the microwave power at high altitudes for use in the transfer of energy to space vehicles. Such antenna assemblies may be partially supported in a large hollowed area on the earth's surface or other convenient means of support.

The space vehicle or helicopter 70 can be described as a main body member supporting antenna-rectifier means 82 including a large number of the so-called modules connected together and rigidly supported in a planar parallel array. A motor 84 is supported by the combined body member and the receiving antenna-rectifier means and actuates the rotor 86 of conventional design employed in such self-propelled hovering vehicles. The disclosed vehicle provides for the illumination of the planar array of the semiconductor diode dipole elements by the microwave beam and the direct conversion of the microwave power transmitted by the beam into usable electrical energy for the self-propulsion of the device without any local fuel supply being required.

Figure 8:
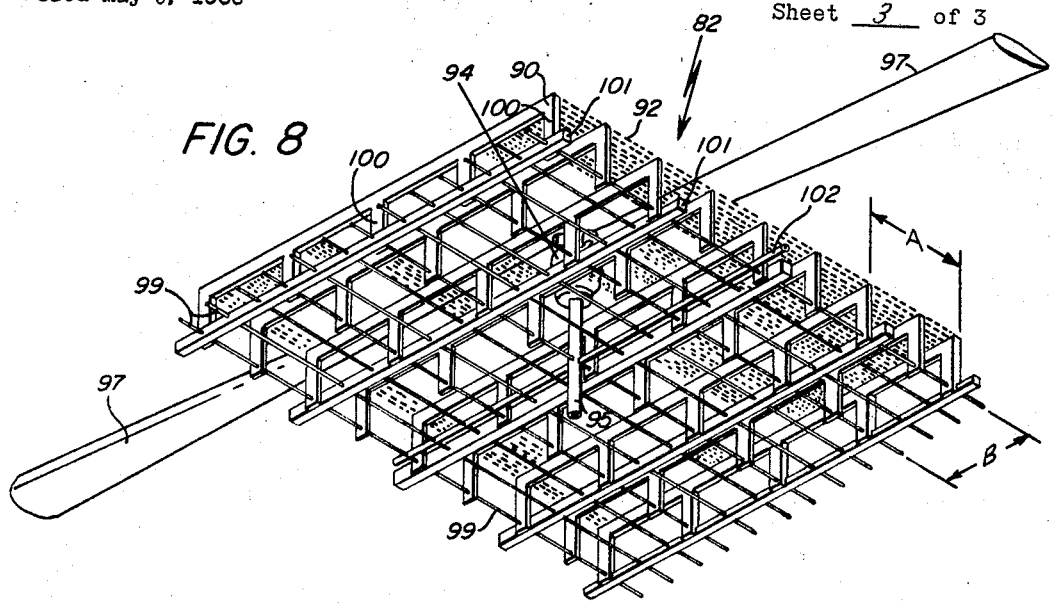
FIG. 8 is a perspective view of the aerospace vehicle embodiment as viewed from the under portion thereof.
Figure 9:
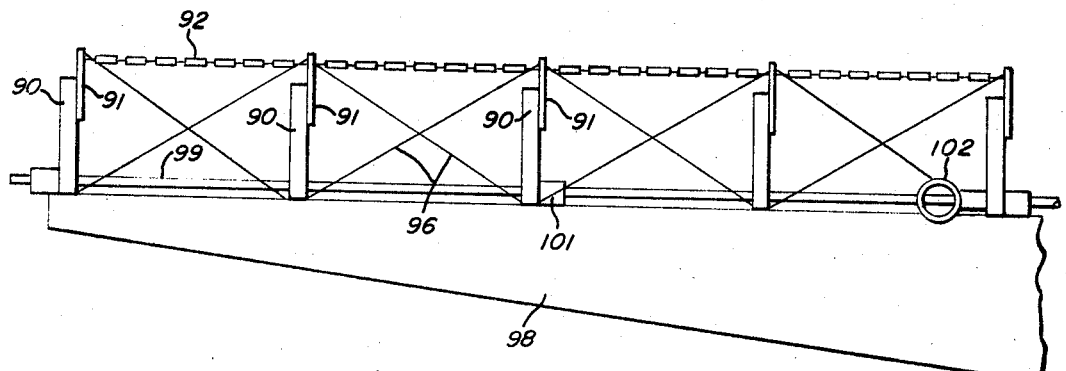
FIG. 9 is an enlarged partial view in elevation of a portion of the illustrative embodiment shown in FIG. 8.

FIGS. 8 and 9 illustrate a space vehicle 82 comprising a plurality of the combined receiving antenna-rectifier module means for interception and rectification of the electromagnetic microwave energy beam emanating from an earth or mother planet source. A planar array of the antenna-rectifier modules is mechanically supported by means of structural members 90 of any lightweight wood or metal. Insulators 91 positioned coextensive with the members 90 support the diode rectifier array and avoid interference with the receiving and electrical performance characteristics by the structural support members. Carrying forward the module concept of 280 diode rectifiers to provide an approximate power output of 14 watts, it was noted that any number of such modules may be coupled together since the individual module outputs are relatively insensitive to a wide range of load resistances connected to the common output terminals. To achieve the desired electrical output of approximately 120 volts and 250 watts of power, subgroups of four modules each were assembled and parallel connected with an approximate 30 volts available for each subgroup. Four such subgroups were series-connected to result in a total of 4,480 diode rectifiers or 16 modules assembled in a two foot square self-supporting planar parallel array structure. The individual diode rectifiers connected in each arm of the bridge network are indicated by the numeral 92. An exemplary module configuration would extend within the area delineated by the dotted lines and reference letter A on one side and similar dotted lines and reference letter B on the other side.

A motor 94 is connected to the DC side of the overall array and may be additionally supported by tubular member 95. A shaft and propulsion means consisting of rotor blades 97 provide for the upward lift of the overall vehicle for the self-supporting of same in space applications. Additional structural support such as interlaced rigging 96 of a high tensile strength material such as nylon or steel wire, as well as bracing member 98, may be employed for strengthening of the body means to withstand the vibrational forces and downwash from the propulsion means.

In accordance with the well known technology of microwave transmission the combined array of diode rectifiers and propulsion means presents a specific load impedance which must be suitably matched to the transmitted microwave energy beam to result in maximum efficiency. In aerospace applications a mismatch of approximately ten to one may be evident. Matching of the load impedance to a value of approximately 377 ohms as the free space value will be provided by a plurality of coplanar parallel metallic rod members 99 disposed in a grating array in front of the diode rectifiers a predetermined distance. Rod members 99 are linearly disposed and extend in a similar direction as the assembled diode rectifiers. A selected frontal spacing of one-quarter of the wavelength of the microwave frequency being transmitted has been experimentally determined to be suitable for impedance matching purposes. An approximate spacing of two inches between the respective members was preferred for a selected microwave frequency of 2,450 megacycles. Each of the members 90 are provided with lateral sections 100 to support the elongated bar members 101 which in turn maintain the rod members 99 in the desired position. A tubular member 102 of a lightweight metal may also be provided to combine with the motor support member 95 for structural support.

The combined antenna-rectifier array provides a source of electrical energy to render any space vehicle self-supporting. The diode rectifier elements when assembled in the antenna array have been found to be nondirectional with respect to interception of the beamed microwave energy. This represents a large step forward in the utilization of high power microwave energy over the prior art horn-type receiving antennas which must be accurately focused and pointed in a particular direction for the reception of any energy. The connections between the respective members of the diode rectifier array and deployment in the parallel configuration serves to provide maximum exposed area. Such connections and in particular the end loop portions adjacent the terminus of each arm of the bridge networks serves as an efficient dipole for the interception of the microwave energy.

Although it is not intended as a full explanation of the high degree of efficiency attained with the disclosed antenna-rectifier array, it is believed that the whisker elements within the semiconductor diodes themselves are a contributing factor and may function as additional dipole elements. The disclosed embodiment functioned efficiently when illuminated by microwave energy generating a vertically polarized beam. Hence, an efficient and light weight energy conversion apparatus is disclosed which may be self-supporting without the requirement of a large local fuel supply payload.

It may be within the purview of the invention to use the available rectified electrical energy for performing many functions in addition to the actuation of the propulsion means. Hence, communications' payloads may be maintained at predetermined positions in space in a hovering attitude utilizing a portion of the electrical energy available. Relay signals to other such vehicles or return signals to ground stations would then be within the realm of possibility. Such available energy may also be employed for servomechanisms, stabilizing and countertorque systems for the navigation of such vehicles.

The electrical efficiencies realized with the combined receiving antenna and rectifier means have also provided certain weight advantages over other energy converters in aerospace applications. Examples of such converters would be heat exchangers or solar cells. In comparison to the present invention where five to eight pounds per kilowatt of energy realized is a normal characteristic, other energy conversion means weigh in the vicinity of 150 pounds per kilowatt of realizable energy. The inherent advantages of the present invention are therefore apparent. While the technology in the diode rectifier art is being continually advanced, new diode power rectifiers as well as integrated circuit techniques are readily available to future configurations of the present invention. The so-called Schottky barrier diodes could be employed to produce combined antenna-rectifier means weighing even less than two pounds per kilowatt of available energy.

Although the foregoing detailed description has referred to DC power rectification it will be evident that with suitable circuit components low frequency AC energy may also be made available. In addition, other propulsion means may be readily substituted using electrical energy. The embodiments disclosed herein are illustrative only and other modifications or alterations will be apparent to those skilled in the art which do not depart from the scope of the broadest aspects of the present invention as defined in the appended claims.

What is claimed is:
1. A space vehicle comprising:
  body means;
  said body means including spaced structural support members;
  combined antenna and DC electrical energy rectification means for the interception and rectification of incident high frequency electromagnetic microwave energy carried by said support members in a planar parallel array;
  said rectification means comprising a plurality of four arm full-wave bridge connected rectifier circuit networks each having a plurality of unidirectional semiconductors in each arm;
  said networks being electrically interconnected to common output terminals;
  electrically operable propulsion means comprising a motor and rotor members carried by said body means and connected to said terminals for the utilization of said rectified DC energy; and
  means for matching the load impedance of said combined antenna and electrical energy rectification means to the incident microwave energy.

2. A space vehicle according to claim 1 wherein said load impedance matching means are arranged in a coplanar array coextensive with said antenna and energy rectification means array, and spaced therefrom a distance of approximately one-quarter of a wavelength at the frequency of the microwave energy.

3. A space vehicle according to claim 2 wherein said load impedance matching means comprise a plurality of parallel disposed elongated metallic members.

References Cited
UNITED STATES PATENTS

| | | | |
|---|---|---|---|
| 1,217,149 | 2/1917 | Caldwell | 321—27 X |
| 2,165,055 | 7/1939 | Kafka | 321—27 |
| 2,444,458 | 7/1948 | Master | 321—8 |
| 2,927,321 | 3/1960 | Harris | 343—6.8 X |
| 3,098,971 | 7/1963 | Richardson | 325—592 X |
| 3,174,705 | 3/1965 | Schiff et al. | 244—1 |

RODNEY D. BENNETT, *Primary Examiner.*

MALCOMB F. HUBLER, *Assistant Examiner.*

U.S. Cl. X.R.

307—151; 318—16; 321—27; 325—494; 343—100